INVENTOR
RONALD G. SAFFRON
BY WILLIAM A. DRUCKER
ATTORNEY

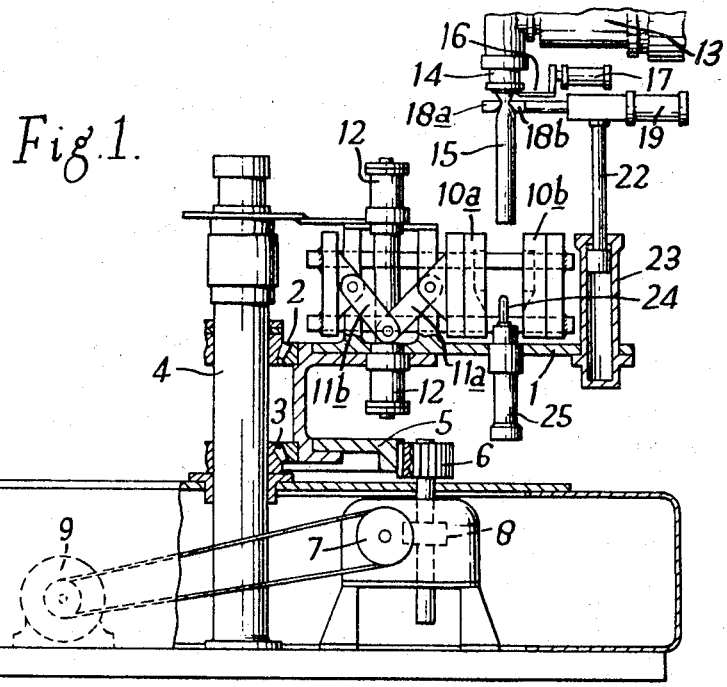
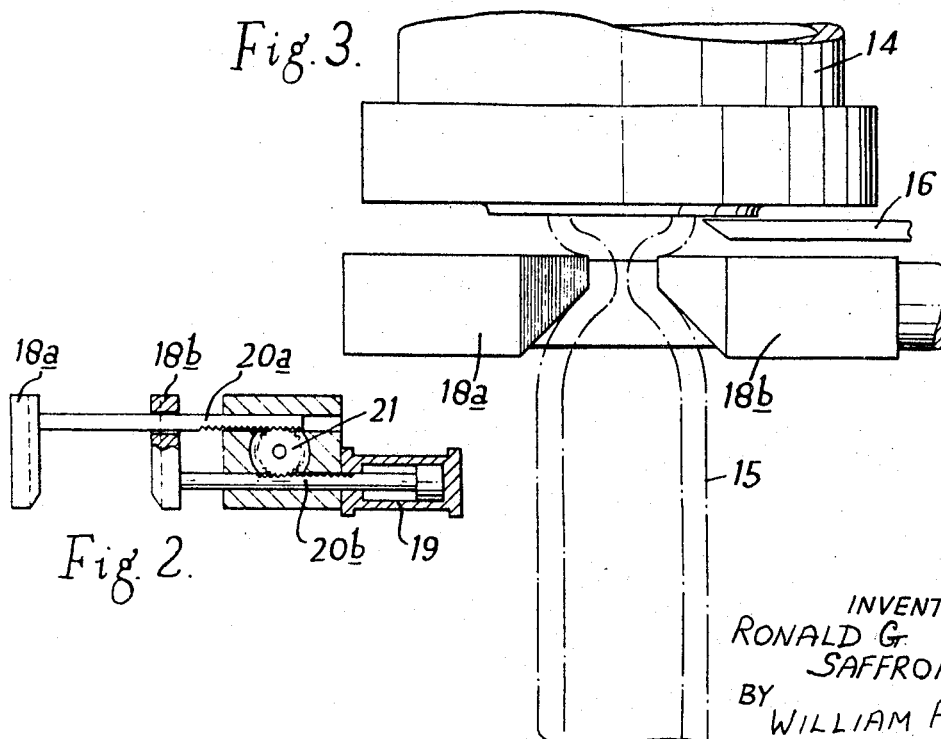

United States Patent Office 3,429,002
Patented Feb. 25, 1969

3,429,002
MACHINES FOR THE BLOWING OF HOLLOW
ARTICLES OF THERMOPLASTIC MATERIAL
Ronald George Saffron, 291 Watling St., Dartford,
Kent, England
Filed Mar. 17, 1966, Ser. No. 535,250
U.S. Cl. 18—5                                2 Claims
Int. Cl. B29c 5/06

ABSTRACT OF THE DISCLOSURE

There is disclosed a machine, for the blowing of hollow articles of thermoplastic material, comprising means for producing a tubular extrusion of the material in a heated and softened state, means mounted adjacent said extrusion means for severing successive lengths of said extrusion, a die carrier having a plurality of split blowing dies mounted thereon, said die carrier being movable at a constant speed in relation to the extrusion means for bringing the plurality of dies serially into and beyond an extrusion receiving position aligned with an outlet of the extrusion means, extrusion transfer means positioned adjacent to the extrusion means for engagement with each said severed length of extrusion, said transfer means being movable in a parallel path and at the same speed as the dies and serving to deliver said severed length of extrusion into an opened die, and means for blowing the length of extrusion in said die when said die is closed.

---

This invention relates to machines for the blowing of hollow articles, such as bottles, of thermoplastic synthetic resinous materials.

A known method for the production of such hollow articles comprises broadly the steps of forming a tubular extrusion of the material in a heated softened state, disposing a suitable length of extrusion in a split die, blowing the article to shape in the die, allowing it to cool sufficiently to harden, and removing it from the die. As a further refinement the blowing may be in two stages, i.e. to provide a pre-form, and thereafter to blow the pre-form to the final shape.

In order to obtain a high rate of production it has already become conventional in the art to utilise a single extruder to feed extruded material to a plurality of blowing dies carried on a rotary table. In order to permit the various stages to be carried out, it has hitherto been essential to have the rotary table indexed serially through successive halt positions, each halt position involving for example the feeding of a length of extrusion to a first die, the blowing of the article or a pre-form in a second die, the expulsion of a preform or article from a third die, and so on.

Such an arrangement involves the carrying of a number of dies and their associated controls on the rotary table, and the table itself must necessarily be relatively rugged so as to be adequately rigid. Accordingly, in existing apparatus of this nature there has always been a tendency to have (i) relatively heavy power consumption due to the necessity to accelerate the table from a stationary condition at each stage, (ii) relatively heavy wear on the means required for precise indexing of the table into its successive positions, e.g. a Geneva Wheel assembly or the equivalent, (iii) loss of time due to the halt periods occurring during operation of the table.

It is accordingly the object of the present invention to provide an improvement whereby motion of the die carrier relative to the extruder can be a steady motion without fluctuation of speed, thereby considerably reducing the driving power consumption, and eliminating any need for step-by-step motion.

According to the present invention, a machine for the blowing of hollow articles of thermoplastic material includes means for producing a tubular extrusion of the material in a heated softened state, means for severing lengths of said extrusion, a carrier having a plurality of split blowing dies and movable at a constant speed to bring the dies serially into and beyond an extrusion-receiving position aligned with the outlet of the extrusion means, extrusion transfer means serving to engage with a severed length of extrusion and, whilst moving in a parallel path and at the same speed as an adjacent die, to deliver said severed length of extrusion into the opened die, and means for blowing the length of extrusion in said die when closed.

The extrusion transfer means may itself serve as means to sever a suitable length of the extrusion from that produced by the extruding means, but in a preferred arrangement there is provided a cutting device which is operable to sever a length of extrusion in synchronism with engagement of the transfer means with the extrusion.

It will be known to those skilled in this art that a rotary motion of the die carrier has very many advantages for continuous high speed production, and accordingly it is preferred to have the dies moved in a circular path, e.g. carried on a rotary table.

It is only necessary that the transfer means shall follow the path of movement of the adjacent opened die for as long as is necessary for transfer of the cut length of extrusion to take place, and accordingly a single transfer means could be arranged to coact in turn with each of the dies. However, for ease of synchronising of the movement of the transfer means with that of the dies it is preferred to have the transfer means follow the movement of the dies throughout, e.g. to have a plurality of transfer means each of which is associated with and follows the movement of a respective die.

The transfer means advantageously include gripping jaws movable oppositely transversely to the path of movement of the transfer means as a whole, and adapted to grip the upper end portion of the cut off length of extrusion.

The transfer means and extruder are preferably arranged at such levels above that of the blowing die that the transfer means can lower the extrusion by at least the latter's own length into the opened die. This positioning of the extruder at a height above and well clear of the path of movement of the dies permits, in a rotary machine, the utilisation of a greater proportion of the total period of a rotation to be utilised for cooling the formed article in the blowing die before ejecting it, this being a considerable advantage where continuous high speed operation is a necessity.

In accordance with conventional practice in the art, one method of blowing the article includes the steps of sealing one end of the extrusion in the closed die, e.g. by nipping it between the closing die parts, and thereafter passing compressed air into the extrusion through a nozzle at the other end of the die to blow the extrusion to the shape of the die. In a first embodiment described below, the blowing means includes a nozzle arranged to feed blowing air at the end of the die remote from the extruder.

In some instances, for example, where it is desired to form a bottle having a neck provided with an external thread which should not display pinch-off lines down the side of the thread form, it is advantageous to introduce the blowing air at the top end of the extrusion, i.e. usually the end nearer to the extruder. For this purpose, in a second embodiment described below, the blowing means includes a nozzle arranged to feed blowing air at the end of the die near the extruder, and in particular to engage with a portion of the severed length of extrusion situated in a recess in the transfer means. The upper end portion of the extrusion may then itself form a sealing gland between the nozzle outlet and the transfer means. Such an upper-end blowing device may also be carried by the die carrier, one such device being associated with each die.

The upper end nozzle is preferably arranged to be movable transversely with respect to the axis of the extruder outlet, for movement into alignment with the transfer means and for subsequently retraction out of the path of the extrusion being delivered by the extruder, and also along the axis of the die towards and away from the transfer means.

In order that the nature of the invention may be readily ascertained, two embodiments of blowing machine in accordance therewith are hereinafter particularly described with reference to the figures of the accompanying drawings, wherein:

FIG. 1 is a partial elevation of a first embodiment of blowing machine, in which the pre-form is blown from below.

FIG. 2 is a horizontal section, to an enlarged scale, of a transfer device.

FIG. 3 is an elevation, to a larger scale, of part of the machine to show the operation of the transfer device and a severing cutter.

Figure 4:
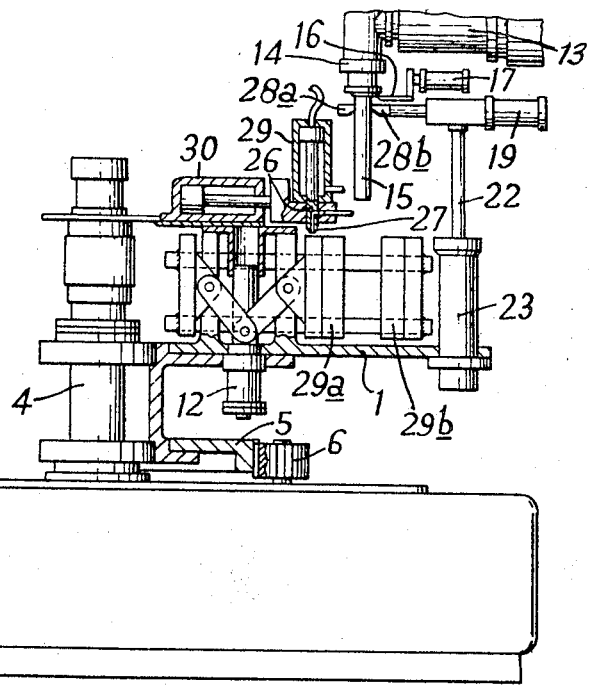
FIG. 4 is a partial elevation of a second embodiment of blowing machine, in which the pre-form is blown from above.

In both of the embodiments to be described, the machine comprises the following main assemblies:

(i) a rotary die carrier
(ii) a plurality of split blowing dies arranged on the same pitch circle of the carrier
(iii) means for opening and closing the dies
(iv) a stationary extruding head
(v) a severing knife movable across below the extrusion head
(vi) a plurality of transfer devices on the carrier, one per die
(vii) a lower-end blow-stick (FIG. 1), or a radially retractable upper end nozzle (FIG. 4), for each die
(viii) means for rotating the carrier at a constant, but very firmly-adjustable, rate
(ix) timed hydraulic services and compressed air services.

*Die carrier and drive means*

The die carrier is a rigid circular table 1 mounted by spaced conical roller bearings 2, 3 on a vertical centre shaft 4. Below the table is coupled a pinion 5 meshed with a smaller driving pinion 6 driven through a worm 7 and worm wheel 8 from an electric motor 9, the speed being micrometrically adjustable by conventional means (not shown).

*Blowing dies and operating means*

A number, such as six or eight, of split blowing dies are carried at equal radii and symmetrically spaced about the table 1. Each die has its halves 10a, 10b connected respectively to the arms 11a, 11b of a toggle operable by a double-acting air or hydraulic ram 12 cylinder, the die halves 10a, 10b being separable radially of the table 1.

*Extruding head*

An extruding head 13 is positioned stationarily with its nozzle 14 facing downwards and aligned with the pitch circle which includes the axes of all the split blowing dies, and at a height above the dies greater than the length of extrusion to be used. The extruder is operated to produce a continuous extrusion 15 at a steady rate.

*Severing knife*

This is positioned with its blade 16 at a level slightly below the outlet of the extruder nozzle 14 and is shiftable by a double-acting air or hydraulic ram 17 to and fro across the extruder nozzle outlet to sever length of depending extrusion 15.

*Tranfser devices*

A plurality of transfer devices are mounted in the table 1, one such device being associated with each die. Each transfer device comprises a pair of horizontally-separable jaws 18a, 18b having their line of meeting on the same pitch circle as the split blowing dies, said jaws being shiftable together and apart by a hydraulic or air ram 19, as best seen in FIG. 2. The two jaws 18a, 18b are carried by respective racks 20a, 20b meshed with a common pinion 21, thereby to carry out equal and opposite movements.

Each transfer device is carried on the vertical shaft 22 of a double-acting hydraulic or air ram 23 mounted on the table 1 externally of the split blowing associated die.

*Air nozzle*

(a) In FIG. 1 there is shown a lower end nozzle 24; this is upwardly directed and aligned with the axes of the die and is shiftable vertically through a small range by a hydraulic or air ram 25.

Figure 5:
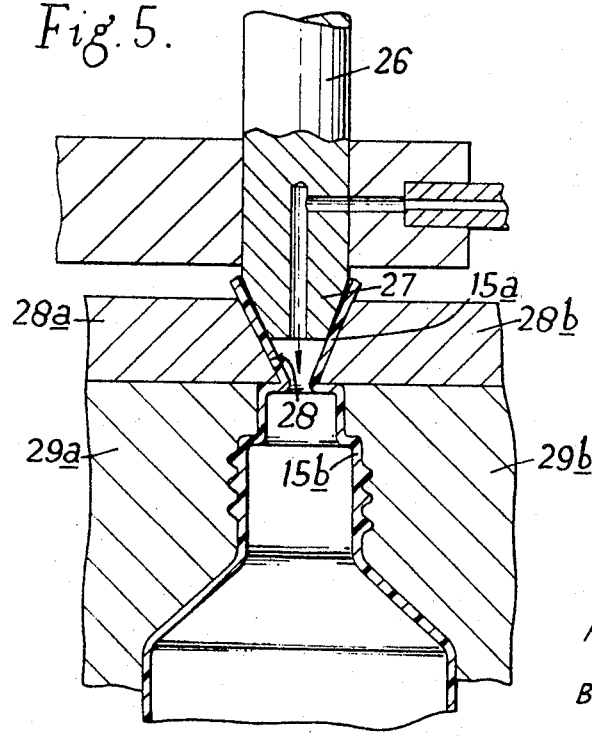
FIG. 5 is an elevation to a larger scale, of part of the embodiment of FIG. 4.

(b) In FIG. 4, there is shown an upper end nozzle 26. This is provided with a tapered nozzle 27 to engage with the upper end 15a of a severed length 15b of extrusion in a conical recess or seating 28 formed in the upper surface of modified pick-up jaws 28a, 28b (see FIG. 5). The nozzle 26 is vertically shiftable by a first hydraulic or air ram 29, and that assembly is itself horizontally shiftable radially of the table 1 by a second hydraulic or air ram 30. In the inner position, the nozzle assembly is retracted inwardly clear of the relative path of the extrusion 15, whilst in the outer position the nozzle is aligned with the die axis.

*Timed hydraulic or air services*

These do not form part of the invention, and are accordingly not shown. They are conveniently obtained by utilising rotation of the table 1 to operate a multiple master valve formed by stationary and rotating elements mounted respecively on the shaft 4 and on the table 1 itself.

*Operation*

The extruder 13 produces a continuous extrusion 15 at a uniform rate. At timed intervals, as each transfer device comes into alignment with the extruder 13, the jaws 18a, 18b (FIG. 1) or 28a, 28b (FIG. 4) of the transfer device close onto the extrusion 15 and the knife 16 severs the extrusion above the jaws. As the table 1 continues to rotate the transfer device (moving with the table) lowers the severed length of extrusion until (in the embodiment of FIG. 1) its lower end is engaged over the (lower end) nozzle 24. The die halves 10a, 10b then close, and nip the top end of the extrusion 15. Compressed air enters through the nozzle 24 and blows the extrusion to the shape of the die.

Where upper end blowing is utilised (FIG. 4), the transfer device (moving with the table) lowers the severed length of extrusion 15b into the die, the die halves 29a, 29b close and nip the lower end of the extrusion, and the (upper end) nozzle 26 embeds itself into the upper end neck 15a of the extrusion and blows compressed air thereinto to form the article.

Finally, shortly before a complete rotation of the table is effected, the die opens and the blown article is ejected.

The same sequence occurs for each die so that at any moment the die table will be transporting articles in various stages of being formed.

Such a machine has its table rotating evenly without accelerations and decelerations, and may produce a higher output while having its table rotating more slowly than the table of the conventional indexed machine.

I claim:
1. A machine for the blowing of hollow articles of thermoplastic material, comprising: extrusion means for producing a tubular extrusion of the material in a heated and softened state; means mounted adjacent said extrusion means for parting off successive lengths of said extrusion; a die carrier having a plurality of split blowing dies mounted thereon, said die carrier being movable at a constant speed in relation to the extrusion means for bringing the plurality of dies serially into and beyond an extrusion-receiving position aligned with an outlet of the extrusion means; extrusion pick-up means positioned adjacent to the extrusion means for engagement with each said parted-off length of extrusion, said pick-up means comprising a plurality of pick-up devices each of which is associated with and follows the movement of a respective die, said pick-up devices being movable in a parallel path and at the same speed as the dies and serving to deliver said parted-off length of extrusion into an opened die; and means for blowing the length of extrusion in said die when said die is closed.

2. A machine for the blowing of hollow articles of thermoplastic material, as claimed in claim 1, wherein the pick-up devices each comprise a pair of gripping jaws movable oppositely and transversely to the path of movement of the pick-up means as a whole.

References Cited

UNITED STATES PATENTS

| | | | |
|---|---|---|---|
| 3,081,489 | 3/1963 | Jackson et al. | 18—5 |
| 3,225,382 | 12/1965 | Hagen | 18—5 |
| 3,257,687 | 6/1966 | Fogelberg et al. | 18—5 |
| 3,287,482 | 11/1966 | Wnek et al. | 18—5 |

FOREIGN PATENTS

| | | |
|---|---|---|
| 940,957 | 11/1963 | Great Britain. |
| 1,033,476 | 1/1966 | Great Britain. |

WILBUR L. McBAY, *Primary Examiner.*